United States Patent [19]

Shibayama et al.

[11] Patent Number: 5,121,206
[45] Date of Patent: Jun. 9, 1992

[54] CLOCK SIGNAL GENERATOR FOR VIDEO SIGNAL CAPABLE OF GENERATING A STABLE CLOCK SIGNAL

[75] Inventors: Kenji Shibayama, Shinagawa; Hidetoshi Ozaki, Chofu, both of Japan

[73] Assignee: Victor Company of Japan, Ltd., Yokohama, Japan

[21] Appl. No.: 526,939

[22] Filed: May 22, 1990

[30] Foreign Application Priority Data

May 24, 1989 [JP] Japan .................. 1-131052

[51] Int. Cl.$^5$ .................. H04N 5/06; H04N 5/76
[52] U.S. Cl. .................. 358/150; 358/335; 380/5
[58] Field of Search .............. 358/148, 149, 150, 151, 358/153, 335, 340; 380/5; 360/37.1

[56] References Cited

U.S. PATENT DOCUMENTS 4,475,129 10/1984 Kagota .................. 380/5
4,937,679 6/1990 Ryan .................. 380/05

Primary Examiner—Victor R. Kostak

Attorney, Agent, or Firm—Fleit, Jacobson, Cohn, Price, Holman & Stern

[57] ABSTRACT

A clock signal generator circuit includes a synchronous signal separation circuit for separating a synchronous signal from an input video signal; a phase-locked loop (PLL) circuit for generating a clock signal in synchronism with the synchronous signal of the video signal supplied from the separation circuit; a switch provided between the separation circuit and PLL circuit for intercepting a supply of the synchronous signal of the video signal from the separation circuit to the PLL circuit during a predetermined period; and a control circuit for further separating a vertical synchronous signal from the synchronous signal separated by the separation circuit and controlling, in accordance with the vertical synchronous signal, the switch so as to intercept a supply of the synchronous signal from the separation circuit to the PLL circuit during the predetermined period, the predetermined period being a pulse generation period during which there are present at least an equalizing pulse and dubbing preventing signal in the video signal.

8 Claims, 5 Drawing Sheets

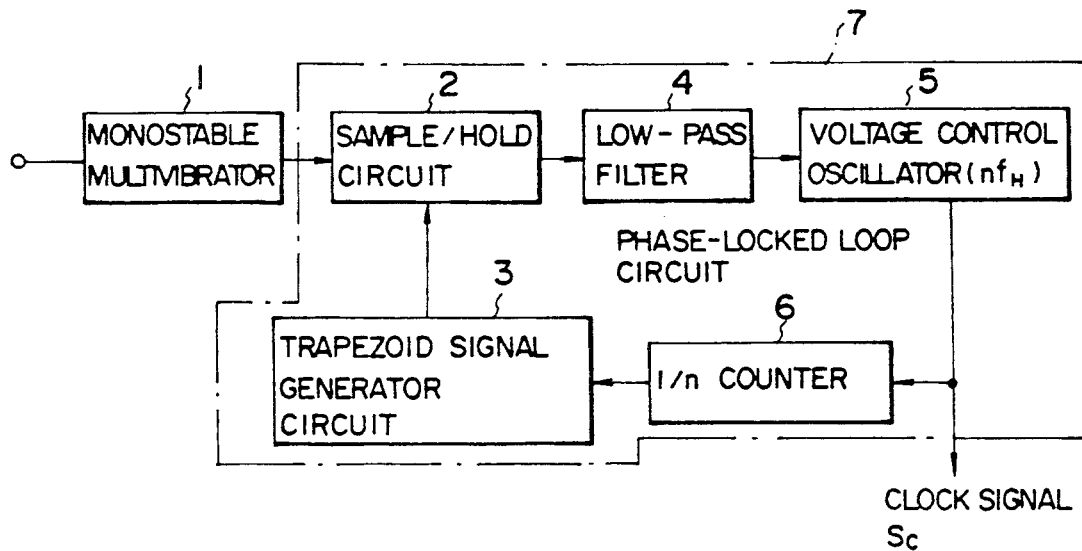
FIG. I PRIOR ART
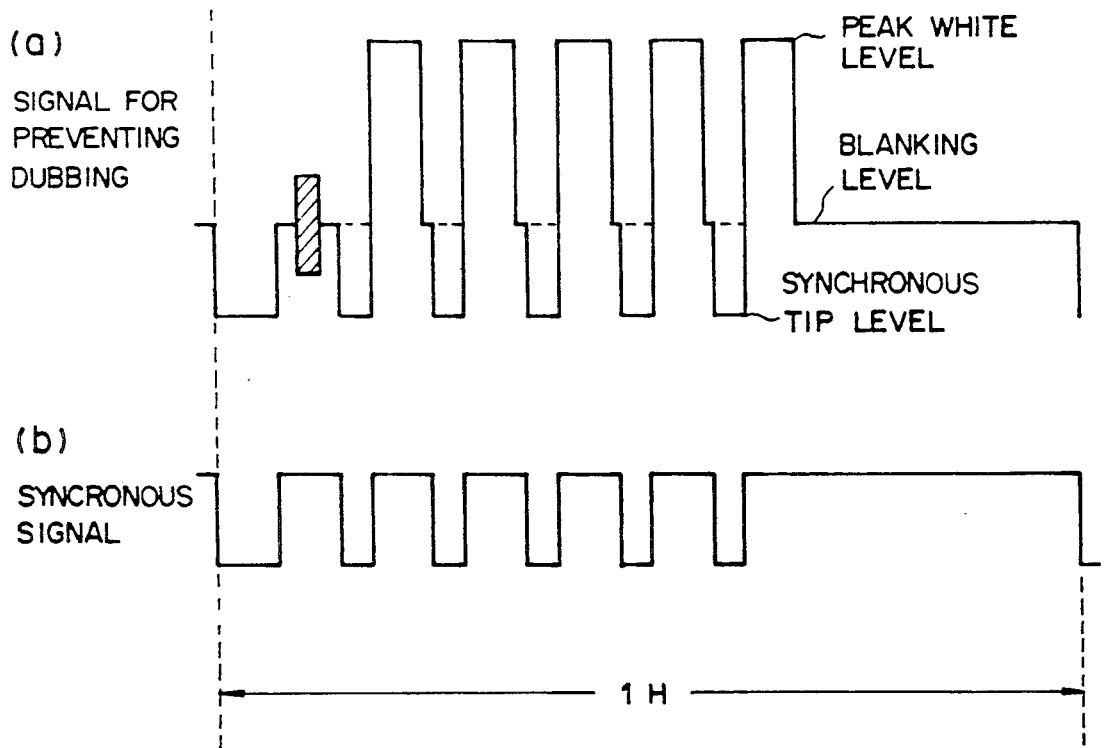
FIG. 2 PRIOR ART

CLOCK SIGNAL GENERATOR FOR VIDEO SIGNAL CAPABLE OF GENERATING A STABLE CLOCK SIGNAL

BACKGROUND OF THE INVENTION

The present invention relates to a clock signal generator circuit for video signals, and more particularly to a clock generator circuit for generating a clock signal which is used with digital circuits in a video tape recorder, television receiver, projector and the like, with a write circuit for a liquid crystal panel, or with other circuits.

For digital circuits in a television receiver, tape recorder and the like, it is necessary to use a clock signal synchronized with a synchronous signal for video signals, the clock signal having, for example, a frequency of 910 $f_H$ ($f_H$ is the frequency of a horizontal synchronous signal), 1820 $f_H$ or the like. FIG. 1 shows the arrangement of a conventional clock generator circuit for generating such a clock signal.

Referring to FIG. 1, reference numeral 1 represents a monostable multivibrator (hereinafter abbreviated as MM) which is triggered by a synchronous signal contained in an input video signal and generates a pulse in synchronism with the synchronous signal. A sample/-hold (hereinafter abbreviated as S/H) circuit samples and holds a trapezoid signal outputted from a trapezoid signal generator circuit 3, at the timing of an output pulse from MM 2. A low-pass filter (hereinafter abbreviated as LPF) 4 smoothes an output from S/H circuit 2. A voltage control oscillator (hereinafter abbreviated as VCO) 5 generates clock signals having a frequency corresponding to an output from LPF 4. A counter 6 frequency-divides clock signals outputted from VCO 5. A phase-locked loop circuit (hereinafter abbreviated as PLL circuit) 7 is constructed of S/H circuit 2, LPF 4, VCO 5, counter 6 and trapezoid signal generator circuit 3.

When PLL circuit 7 receives a pulse in synchronism with the horizontal synchronous signal contained in an input video signal, it generates a clock signal in synchronism with the phase of the synchronous signal.

With a conventional circuit constructed as above, MM 1 is triggered by a synchronous signal contained in a video signal, and an output signal from MM 1 drives PLL circuit 7. Therefore, as shown in FIG. 2(a), even a dubbing preventing signal having a synchronous tip level component is detected as a synchronous signal which is used then to drive PLL circuit 7. During such period, the frequency of a clock signal is disturbed, thereby posing some problem such as a skew curve in a frame image or erroneous digital processing operation.

Like problems also occur for the case of equalizing pulses during the vertical blanking period. Further, in generating a clock signal in synchronism with a video signal reproduced from a video tape recorder, there is also associated with an erroneous operation because of skews or noises generated upon switching of a rotary head.

SUMMARY OF THE INVENTION

It is an object of the present invention to provide a signal generator circuit capable of generating a stable clock signal free from the skew curve in a frame memory and from the influence of a dubbing preventing signal, noises and the like.

In order to achieve the above object, the present invention provides a clock generator circuit comprising synchronous signal separation means for separating a synchronous signal from a video signal; a vertical synchronous signal separation circuit for further separating a vertical synchronous signal derived from the video signal; controlling means, including at least a pulse generator circuit for receiving the vertical synchronous signal and generating a control pulse during the period while at least an equalizing pulse and dubbing preventing signal of the video signal are present, for controlling the video signal in accordance with the control pulse; switching means responsive to the control pulse for preventing the synchronous signal from being passed during the period while the control pulse is being generated; and phase-locked loop (PLL) means for generating a clock signal in synchronism with the synchronous signal of the video signal inputted through the switching means.

A vertical synchronous signal is detected from an input video signal. In accordance with this vertical synchronous signal, a control pulse is generated, the control pulse being representative of the timing when at least an equalizing pulse and dubbing preventing signal are present. During the period while the control pulse is being generated, the switching means is actuated such that the synchronous signal is not supplied to the PLL means.

Accordingly, the PLL means is prevented from being driven by a dubbing preventing signal or the like.

BRIEF DESCRIPTION OF THE DRAWINGS

In the accompanying drawings,

FIG. 1 is a block diagram showing an example of the structure of a conventional pulse generator circuit;

FIG. 2 are diagrams showing the waveforms of a dubbing preventing signal and synchronous signal in the circuit shown in FIG. 1;

DETAILED DESCRIPTION OF THE PREFERRED EMBODIMENTS

Figure 3:
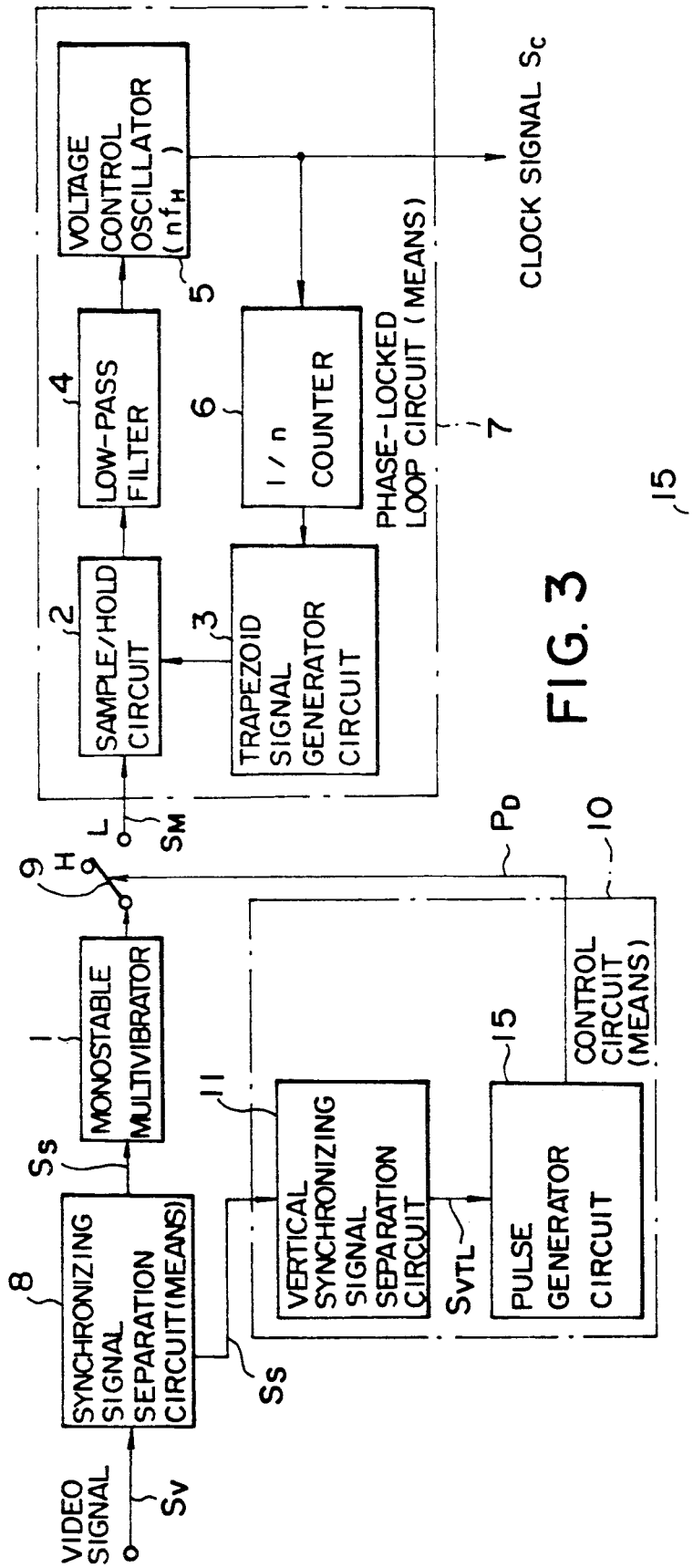
FIG. 3 is a block diagram showing the structure of a clock signal generator circuit according to the first embodiment.

FIG. 3 shows the structure of the clock generator circuit according to the first embodiment of this invention. Corresponding elements to those shown in FIG. 1 are represented by the same reference numerals.

In FIG. 3, reference numeral 8 represents a synchronous signal separation circuit (means) which detects a synchronous signal $S_S$ while separating an input video signal $S_V$ into a horizontal synchronous signal, vertical synchronous signal $S_{VS}$ and the like, for example by comparing the video signal with a predetermined reference level. The vertical synchronous signal $S_{VS}$ is further separated from the synchronous signal $S_S$ by a vertical synchronous signal separation circuit 11 in a control circuit (means) 10. Reference numeral 15 represents a pulse generator circuit included in the control circuit 10. The pulse generator circuit 15 generates a pulse at a predetermined timing by using as a reference the vertical synchronous signal $S_{VS}$ inputted from the vertical synchronous signal separation circuit 11. Reference numeral 9 represents a switch (means) interposed between MM 1 and S/H circuit 2. The switch 9 connects or disconnects the path between MM 1 and S/H circuit 2 in response to an output from the pulse generator circuit 15.

MM 1 is triggered by an output from the synchronous signal separation circuit 8. An output from MM 1 is supplied to S/H circuit 2 via the switch 9. The other circuit structure is the same as shown in FIG. 1.

Figure 4:
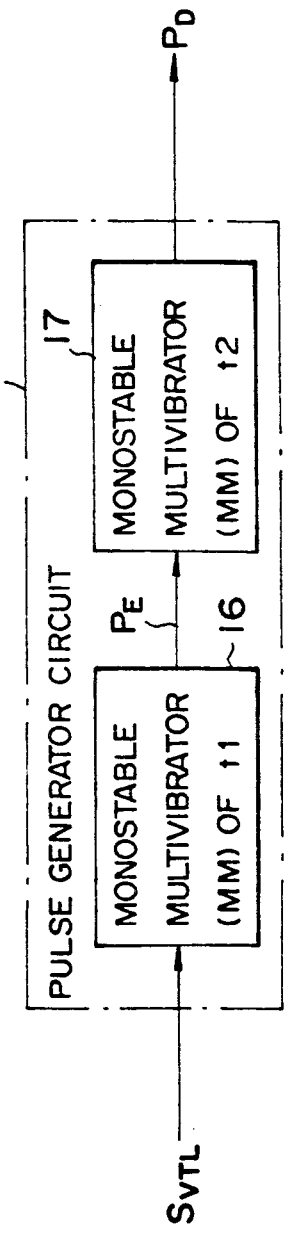
FIG. 4 is a block diagram showing an example of the structure of the pulse generator circuit shown in FIG. 3.

FIG. 4 is a block diagram showing an example of the structure of the pulse generator circuit 15.

As shown in FIG. 4, the pulse generator circuit 15 is constructed of cascade-connected two monostable multivibrators (MM) 16 and 17.

Figure 5:
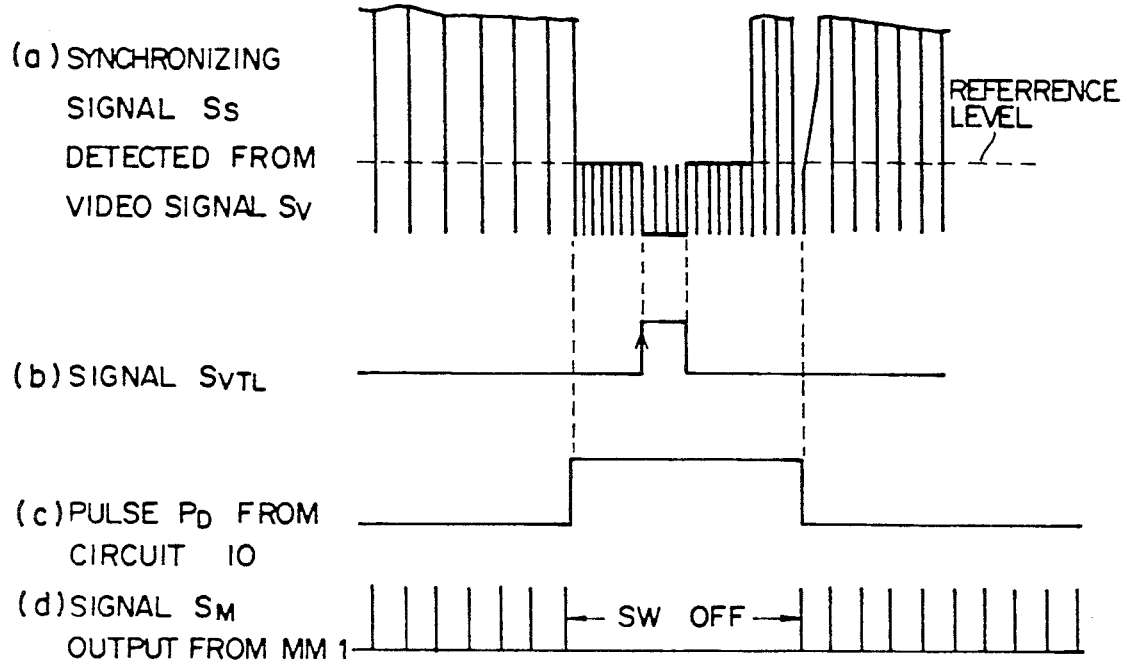
FIG. 5 is a timing chart illustrating the output characteristics at various parts of the clock signal generator circuit of the first embodiment shown in FIG. 3.
Figure 6:
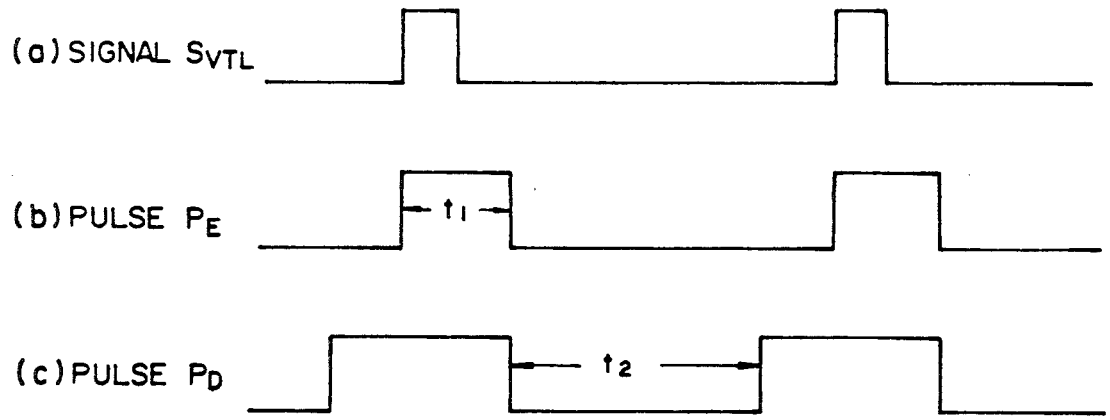
FIG. 6 is a timing chart illustrating the output characteristics of the pulse generator circuit shown in FIG. 4.

The operation will be described with reference to the timing charts shown in FIGS. 5 and 6.

The synchronous signal separation circuit 8 compares an input video signal $S_V$ (shown in FIG. 5(a)) with a predetermined reference level to detect a synchronous signal $S_S$. At this time, in addition to the horizontal synchronous signal and vertical synchronous signal $S_{SV}$, equalizing pulses and dubbing preventing signal having a synchronous tip level component are also separated and detected. MM 1 is triggered by the detected synchronous signal $S_S$, and generates a pulse having a predetermined width each time it is triggered.

An output from the synchronous signal separation circuit 8 is supplied to the vertical synchronous signal separation circuit 11 which detects the vertical synchronous signal $S_{SV}$ from the inputted signal and outputs a signal of H logic level while the vertical synchronous signal is detected (signal $S_{VTL}$ shown in FIGS. 5(b) and 6(a)).

An output from the vertical synchronous signal separation circuit 11 is inputted to the pulse generator circuit 15 to trigger MM 16. MM 16 then generates a pulse $P_E$ (whose waveform is shown in FIG. 6(b)) of H logic during a predetermined time t1 starting from the rising edge of an output from the vertical synchronous signal separation circuit 11. MM 17 is triggered by pulse $P_E$ and generates a pulse $P_D$ (whose waveform is shown in FIG. 6(c)) of L logic level during a predetermined time t2 starting from the falling edge of pulse $P_E$. The time t1 and t2 are determined such that the vertical synchronous signal, equalizing pulses and dubbing preventing signal are generated while an output from MM 17 takes a logical level H.

The switch 9 is made turned off while the pulse generator circuit 11 outputs a signal of H logic level, and turned on while it outputs a signal of L logic level. Accordingly, an output from MM 1 is inputted to S/H circuit 2 only during the time when the pulse generator circuit 11 outputs a signal of L logic level, and not inputted during the time when it outputs a signal of H logic level (signals $S_M$ shown in FIG. 5(d)).

S/H circuit 2 samples a trapezoid signal generated by the trapezoid signal generator circuit 3 when a sampling pulse is inputted via the switch 9, and holds its value until the next sampling pulse is inputted. An output from S/H circuit 2 is smoothed by LPF 4 and supplied to VCO 5. Using the signal inputted from LPF 4 as a control voltage, VCO 5 generates a clock signal $S_C$ having a frequency corresponding to the control voltage. The clock signal is supplied to digital circuits (not shown) and also to the counter 6. The counter 6 divides the frequency of the clock signal by 1/n in such a manner that it outputs one pulse every time it counts up n inputted pulses. The trapezoid signal generator circuit 3 generates a trapezoid signal in synchronism with a pulse inputted from the counter 6, and supplies it to S/H circuit 2.

In the above manner, PLL circuit 7 generates a clock signal $S_C$ in synchronism with the synchronous signal in a video signal $S_V$.

In the above embodiment, the pulse generator circuit 15 is constructed of MM 16 and MM 17. This circuit may also be constructed by a circuitry which counts synchronous signals and clocks.

According to a first aspect of this invention described above, an output from the synchronous signal separation circuit 8 is not supplied to PLL circuit during the period while at least either an equalizing pulse or dubbing preventing signal is generated. Accordingly, PLL circuit 7 is prevented from being driven by such signals, thereby obtaining a stable signal in synchronism with the synchronous signal.

Figure 7:
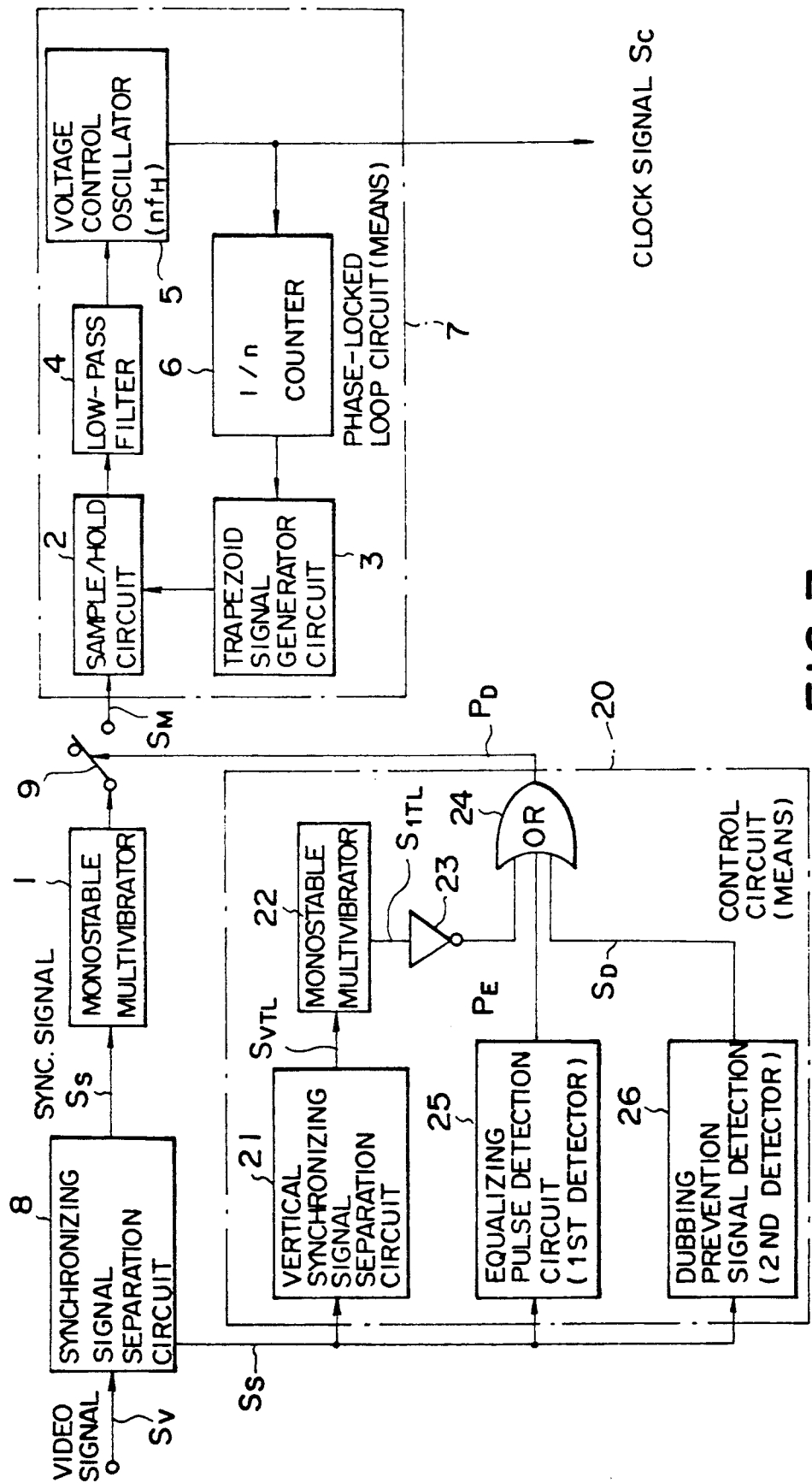
FIG. 7 is a block diagram showing the structure of a clock signal generator according to the second embodiment.

FIG. 7 is a block diagram showing the structure of a clock generator circuit according to the second embodiment of this invention.

A control circuit (means) 20 is constructed of a vertical synchronous signal separation circuit 21, monostable multivibrator (MM) 22 triggerable by an output from the circuit 21, inverter 23 for inverting an output from MM 22, OR gate 24, equalizing pulse detection circuit (first detector) 25, and dubbing preventing signal detection circuit (second detector) 26. The first and second detectors 25 and 26 detect an equalizing pulse and dubbing preventing signal, respectively, and output their detection signals to the OR gate 24. A switch 9 is turned on and off in accordance with an output from the OR gate 24. The other circuit arrangement is the same as FIG. 3.

Figure 8:
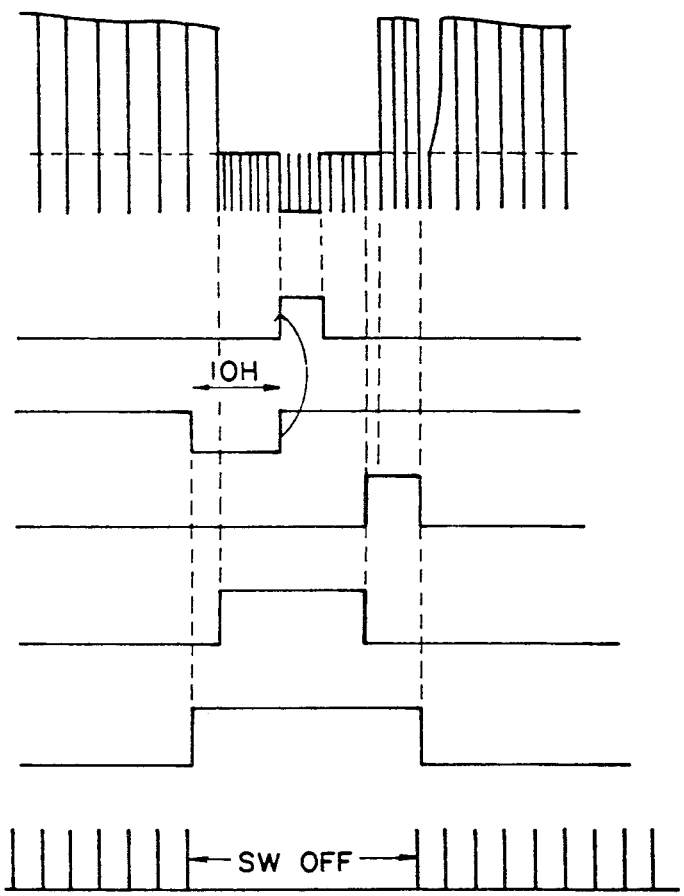
FIG. 8 is a timing chart illustrating the output characteristics at various parts of the clock signal generator circuit of the second embodiment shown in FIG. 7.

The operation of this circuit will be described with reference to FIG. 8.

The synchronous signal separation circuit 8 compares an input video signal $S_V$ (shown in FIG. 8(a)) with a predetermined reference level to detect a synchronous signal $S_S$. At this time, in addition to the horizontal synchronous signal and vertical synchronous signal $S_{SV}$, equalizing pulses and dubbing preventing signal having a synchronous tip level component are also separated and detected. MM 1 is triggered by the detected synchronous signal $S_S$, and generates a pulse having a predetermined width each time it is triggered.

An output from the synchronous signal separation circuit 8 is also supplied to the vertical synchronous signal separation circuit 21, equalizing pulse detection circuit 25 and dubbing preventing signal detection circuit 26.

The vertical synchronous signal separation circuit 21 detects the vertical synchronous signal $S_{SV}$ from the inputted signal and outputs a signal of H logic level while the vertical synchronous signal is detected (signal $S_{VTL}$ shown in FIGS. 8(b)). MM 22 is triggered by the rising edge of an output from the vertical synchronous signal separation circuit 21, and outputs a signal $S_{1TL}$ of H logic level during about one field period (shown in FIG. 8(c)). This signal $S_{1TL}$ takes a logic level L, 10 H (H is the period of the horizontal synchronous signal)

before the next vertical synchronous signal, and changes to an H logic level in response to the rising edge of the vertical synchronous signal. Since this signal $S_{1TL}$ is inverted by the inverter 23, the OR gate 15 receives a signal of H logic level during 10 H period before the vertical synchronous signal. Switching of a rotary head is carried out during this 10 H period.

The dubbing preventing signal detection circuit 26 and equalizing pulse detection circuit 25 detect from an output of the synchronous signal separation circuit 8 a dubbing preventing signal and equalizing pulse, respectively, and output a signal of H logic value while such signal or pulse is detected (pulse $S_D$ shown in FIG. 8(d) and pulse $P_E$ shown in FIG. 8(e)). These signals are supplied to the OR gate 24.

Accordingly, the OR gate 24 outputs a signal of H logic value during the period from when the 10 H period starts before the vertical synchronous signal to when the dubbing pulse prevent signal terminates (pulse $P_D$ shown in FIG. 8(f)). The switch 9 is made turned off while the OR gate 24 outputs a signal of H logic level, and turned on while it outputs a signal of L logic level. Accordingly, an output from MM 1 is inputted to S/H circuit 2 only during the time when the OR gate 24 outputs a signal of L logic level, and not inputted during the time it outputs a signal of H logic level (signals $S_G$ shown in FIG. 8(g)).

The operation of PLL circuit 7 is the same as that described with FIG. 3, so the description therefor is omitted.

According to a second aspect of this invention supported by the above-described second embodiment, a signal inputted to PLL circuit 7 is controlled in response to a detection of a dubbing preventing signal. Therefore, unnecessary signals are not supplied to PLL circuit 7 if a dubbing preventing signal is present. During the period while a dubbing preventing signal is not present, signals are allowed to be inputted to PLL circuit so that the period during which no signal is supplied to PLL circuit can be shortened, to thereby ensure a stable operation of PLL circuit 7.

What is claimed is:

1. A clock signal generator circuit for a video signal comprising:
    synchronous signal separation means for separating a synchronous signal from an input video signal;
    phase-locked loop (PLL) means for generating a clock signal in synchronism with said synchronous signal of said video signal supplied from said separation means;
    switch means provided between said separation means and said PLL means for intercepting a supply of said synchronous signal of said video signal from said separation means to said PLL means during a predetermined period; and
    control means for further separating a vertical synchronous signal from said synchronous signal separated by said separation means and controlling, in accordance with said vertical synchronous signal, said switch means so as to intercept a supply of said synchronous signal from said separation means to said PLL means during said predetermined period, said predetermined period being a pulse generation period during which there are present at least an equalizing pulse and dubbing preventing signal in said video signal.

2. A clock signal generator circuit according to claim 1, wherein said control means comprises a vertical synchronous signal separation circuit for further separating only said vertical synchronous signal from said synchronous signal separated by said synchronous signal separation means, and outputting a signal of a high logic level while said vertical synchronous signal is detected; and a pulse generator circuit for generating a predetermined pulse only during said pulse generation period in accordance with said inputted vertical synchronous signal.

3. A clock signal generator circuit according to claim 2, wherein said pulse generator circuit comprises a first monostable multivibrator for outputting a first pulse signal which takes a high logic level during a first predetermined period starting from the rising edge of said signal outputted from said vertical synchronous signal separation circuit, and a second monostable multivibrator for outputting, when triggered by said first pulse signal, a second pulse signal which takes a low logic level during a second predetermined period starting from the falling edge of said first pulse signal.

4. A clock signal generator circuit according to claim 1, wherein said control means comprises:
    a vertical synchronous signal separation circuit for further separating only said vertical synchronous signal from said synchronous signal separated by said synchronous signal separation means;
    a first detector for receiving said synchronous signal and detecting an equalizing pulse in said video signal;
    a second detector for receiving said synchronous signal and detecting a dubbing preventing signal in said video signal; and
    a logical gate for outputting a control signal for controlling said switch means to intercept a supply of said synchronous signal to said PLL means, in accordance with three pulse signals including a pulse signal having a predetermined width generated in response to an output from said vertical synchronous signal separation circuit, and two pulse signals outputted from said first and second detectors.

5. A clock signal generator circuit according to claim 4, wherein said control means further comprises:
    a monostable multivibrator for outputting a pulse signal which takes a low level during a predetermined period starting from the rising edge of said signal outputted from said vertical synchronous signal separation circuit; and
    an inverter for inverting an output from said monostable multivibrator.

6. A clock signal generator circuit according to claim 4, wherein said logical gate is constructed of an OR gate which performs a logical OR operation between three pulse signals, said three pulse signals including an output from an inverter which inverts an output from a monostable multivibrator outputting a pulse signal having a predetermined period in accordance with an output from said vertical synchronous signal separation circuit, and two outputs from said first and second detectors.

7. A clock signal generator circuit according to claim 1, further comprising a monostable multivibrator connected between said synchronous signal separation means and said switch, said monostable multivibrator outputting a pulse signal having a predetermined width each time upon being triggered by an output from said synchronous signal separation circuit.

8. A clock signal generator circuit according to claim 1, wherein said PLL means comprises a counter for frequency-dividing said clock signal by 1/n, and a trapezoid signal generator circuit for generating a trapezoid signal used in phase-lock, in accordance with an output from said counter.

* * * * *